Oct. 16, 1962   J. S. FRENCH, JR   3,059,073
TRAILER ELECTRICAL CONNECTOR
Filed Nov. 15, 1960

INVENTOR.
JOHN S. FRENCH JR.

United States Patent Office 3,059,073
Patented Oct. 16, 1962

3,059,073
TRAILER ELECTRICAL CONNECTOR
John S. French, Jr., Rte. 1, Bozeman, Mont.
Filed Nov. 15, 1960, Ser. No. 69,333
2 Claims. (Cl. 200—51.09)

The present invention relates to trailers generally and in particularly to an electrical connector for connecting the stop, tail and turn signal lights of a trailer to the electrical system of a towing vehicle.

In the past it has been difficult to connect the turn signal lights of a trailer to the turn signal light system of a towing vehicle for the reason that the flasher unit of the vehicle is not designed to take care of extra lights. It has been necessary therefor to make special wiring arrangements in order that the turn signals of a trailer operate in conjunction with the turn signal mechanism of an automobile or other towing vehicle.

An object of the present invention is to provide, in a single unitary construction, a trailer electrical connector which connects the stop lights, tail lights, and turn signal lights of a trailer to the light system of a towing vehicle, the connector being simple in structure, foolproof in operation, and one economical to manufacture in quantity.

Another object of the present invention is to provide an electrical connector for connecting the light system of a trailer with the light system of a towing vehicle which is of sturdy construction, one having long life characteristics, and one which is highly effective in action.

These and other objects and advantages of the present invention will be fully apparent from the following description when taken in connection with the annexed drawing, in which:

FIGURE 1 is a perspective view of the connector of the present invention with the connection to the trailer installed therein, FIGURE 2 is a front elevational view of the connector with the trailer connection removed, FIGURE 3 is a side elevational view of the assembly shown in FIGURE 2, FIGURE 4 is a view taken on the line 4—4 of FIGURE 2, FIGURE 4a is a perspective view of the contact strips of FIGURE 4.

Figures 1, 4A:
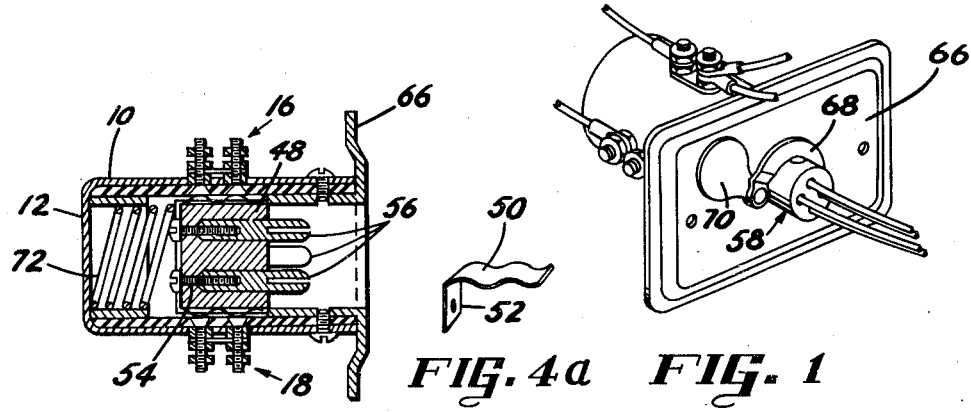
Figure 4:
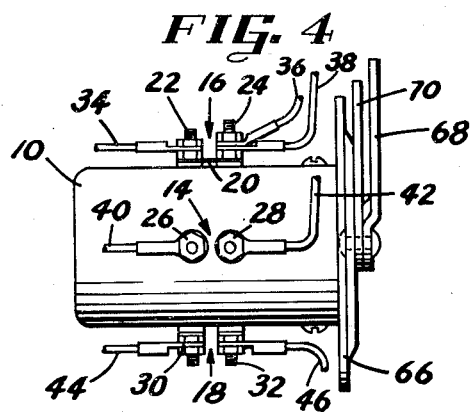
Figures 2, 3:
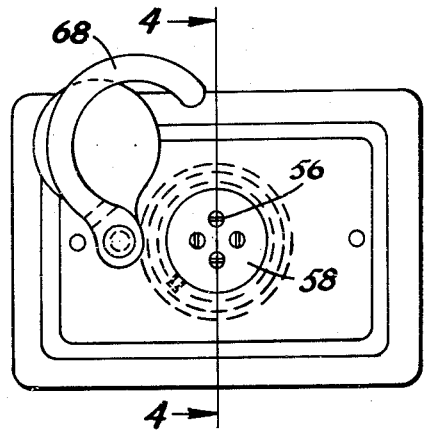

With reference to the drawing, in which like numerals indicate like parts throughout the several views, the invention consists in a cylinder 10 having one end open and the other end closed, as at 12 in FIGURE 4.

Arranged in spaced relation about the cylinder 10 are shown pairs of contacts 14, 16, and 18 with another pair on the opposite side from the pair 14 not being shown.

The contacts of the pair 16 are connected together externally of the cylinder 10 by a bridge element 20. The contacts of the pair 16 are designated by the numerals 22 and 24, those of the pair 14 by the numerals 26 and 28, and those of the pair 18 by the numerals 30 and 32.

The contact 22 is connected by a wire 34 to the hot wire of the tail lights of the towing vehicle, such wire not being shown and the point of connection preferably being the proper side of the switch of the vehicle. Wires 36 and 38 connect the contact 24 to the right and left tail lights of the towing vehicle.

The contact 26 is connected by a wire 40 to the hot side of the left stop and direction signal light of the towing vehicle. The contact 28 is connected by a wire 42 to the left stop and direction signal light of the towing vehicle.

A wire 44 connects the contact 30 to the hot side of the right stop and direction signal light of the towing vehicle and another wire 46 connects the contact 32 to the right stop and direction signal of the towing vehicle.

The pair of contacts on the opposite side from the pair 14 has one contact connected to the frame of the towing vehicle and the other contact connected to the cylinder 10 so as to ground the cylinder 10.

The present invention provides a plunger 48 having four spring metal contact strips 50 each provided with a tongue 52 overlying the end of the plunger and secured thereto by a set screw 54. These strips 50 contact the inner heads of the pairs of contacts previously described when the plunger 48 is in the position inwardly of and spaced from the open end of the cylinder 10, as in FIGURE 4.

The plunger 48 is movable from the position shown in FIGURE 4 to a position toward the closed end 12 of the cylinder 10 and when in this position the strips 50 no longer connect together the contacts of each pair of contacts but are merely an electrical contact with each of the contacts of each pair of contacts adjacent the rearward end or closed end 12 of the cylinder 10.

The strips 50 of the plunger 48 constitute a switch-means normally connecting the pairs of contacts together and the plunger 48 constitutes a depressable switch element carrying such switch-means.

The tongue 52 of each strip 50 connects the strip 50 to a male contact element 56 with the shank of the set screw 54 providing the electrical connection and also securing the male element 56 within the plunger body.

Figure 5:
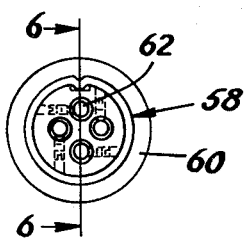
FIGURE 5 is an end elevational view of the trailer connector.
Figure 6:
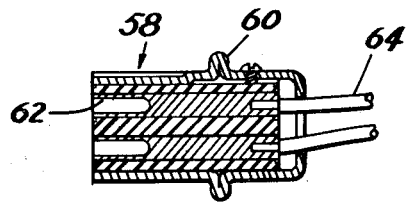
FIGURE 6 is a view taken on line 6—6 of FIGURE 5.

In FIGURES 5 and 6 are shown the trailer connector or connector element 58 having a flange 60 extending thereabout. The connector element 58 is provided with electrically conductive sockets 62, one for each of the male elements 56. The sockets 62 are connected by wires 64 to the respective stop, tail, and turn signal lights of the trailer and also to the frame of the trailer in order to ground the lights of the trailer.

A flange 66 surounds the casing or cylinder 10 and provides a means of mounting the cylinder 10 on the towing vehicle. When the trailer connector 58 is in position within the open end of the cylinder 10 a latch element 68 is swung so as to overlie the flange 60 and hold the connector 58 within the cylinder 10. When the connector 58 is removed a cover element 70 is swung into position protecting the cylinder 10 from the entrance thereinto of dirt or the like.

Spring means is provided biasing the plunger 48 to the position toward the open end of the cylinder 10. This spring means consists in a coil spring 72 having one end bearing against the closed end 12 of the cylinder 10 and having the other end bearing against the plunger 48.

In operation, upon insertion of the trailer connector 58 into the open end of the cylinder 10, the sockets 62 will receive the male elements 56 and at the same time the plunger 48 will be shifted to the position in which the strips 50 disconnect the contacts of each pair of contacts except the contacts of the pair 16 from each other. A bridge element 20 is employed to keep the tail lights of the towing vehicle connected to the switch of the towing vehicle irrespective of whether or not the plunger 48 has been shifted by the insertion of the element 58.

It will be seen therefore that the connector of the present invention will disconnect the turn signals and stop lights of the towing vehicle when the trailer is attached to the towing vehicle but will energize the turn signals and stop lights of the trailer instead.

What is claimed is:

1. In an automotive electrical system including turn signal lights, tail lights, and stop lights, a connector for supplying current from the system to turn signal lights, tail lights, and stop lights installed on a trailer, said connector comprising a cylinder having one end open and the other end closed, a plurality of pairs of contacts extending in spaced relation about the inner wall of said cylinder, a plunger disposed inwardly of the open end of and spaced from the open end of said cylinder and slidable in said cylinder toward the closed end, contact means carried by said plunger and being operable when said plunger is in the normal position to connect each contact of each pair of contacts with the other contact of said pair of contacts and being operable when said plunger has been moved to the position toward the cylinder closed end to disconnect at least one pair of contacts from each other, other electrical contact means carried by said plunger, a connector element engageable with said other contact means when inserted through the open end of said cylinder, said connector element being operable when inserted through the cylinder open end to shift said plunger to the position toward said cylinder closed end.

2. In an automotive electrical system including turn signal lights, tail lights, and stop lights, a connector for supplying current from the system to turn signal lights, tail lights, and stop lights installed on a trailer, said connector comprising a cylinder having one end open and the other end closed, a plurality of pairs of contacts extending in spaced relation about the inner wall of said cylinder, a plunger normally disposed inwardly of the open end of and spaced from the open end of said cylinder and slidable inset cylinder toward the closed end, contact means carried by said plunger and being operable when said plunger is in the normal position to connect each contact of each pair of contacts with the other contact of said pair of contacts and being operable when said plunger has been moved to the position toward the cylinder closed end to disconnect at least one pair of contacts from each other, other electrical contact means carried by said plunger, a connector element engageable with said other contact means when inserted through the open end of said cylinder, said connector element being operable when inserted through the cylinder open end to shift said plunger to the position toward said cylinder closed end, and spring means operatively connected to said cylinder and said plunger biasing the latter toward the open end of said cylinder.

References Cited in the file of this patent

UNITED STATES PATENTS

| | | |
|---|---|---|
| 402,829 | Hopkins | May 7, 1889 |
| 2,312,002 | Schmitt | Feb. 23, 1943 |
| 2,503,569 | Verkuil | Apr. 23, 1950 |